June 24, 1947.  P. BAIA  2,422,816
INSPECTION PROJECTOR FOR MOTION PICTURE FILM
Filed April 18, 1945   3 Sheets-Sheet 1

INVENTOR.
Philip Baia
BY
Attorney

June 24, 1947.　　　　　P. BAIA　　　　　2,422,816
INSPECTION PROJECTOR FOR MOTION PICTURE FILM
Filed April 18, 1945　　　3 Sheets-Sheet 2

INVENTOR.
Philip Baia
BY
Attorney

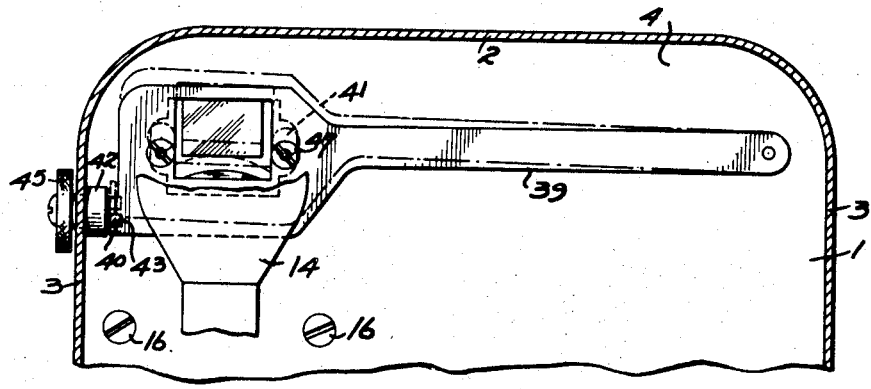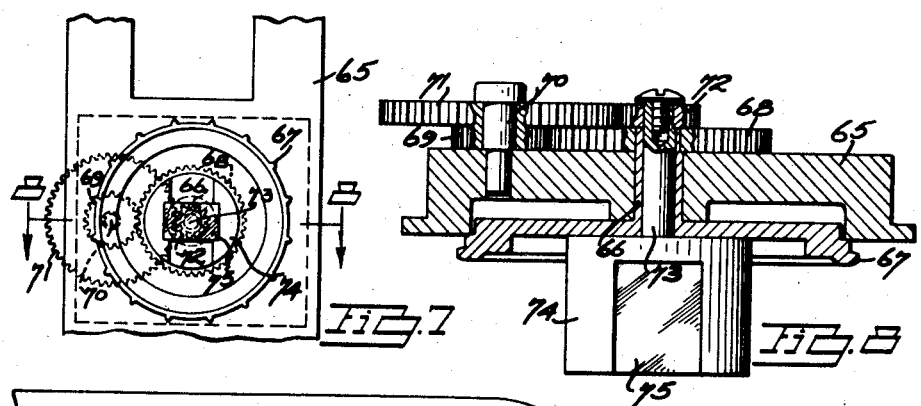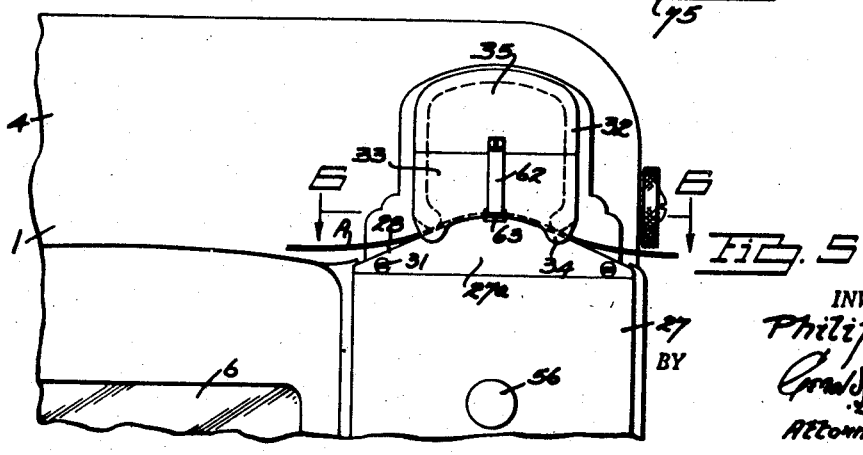

Patented June 24, 1947

2,422,816

UNITED STATES PATENT OFFICE 2,422,816

INSPECTION PROJECTOR FOR MOTION-PICTURE FILM

Philip Baia, Highland Park, Mich.

Application April 18, 1945, Serial No. 589,038

15 Claims. (Cl. 88—24)

This invention relates to improvements in viewers, and refers particularly to an action viewer for inspecting the frames of a motion picture film in sequence.

It is an object of the invention to provide a viewer including a casing having a crowned rest projecting outwardly on one side thereof over which a film is adapted to travel, to mount a hood for movement in a substantially vertical path on the outside of the casing over the rest to retain the film in contact with the latter, and to provide means on the hood for insuring proper tracking of the film; thereby providing ready means for inserting a film into position over the rest and for holding it in its proper position during its passage thereover to eliminate flickering and jumpiness, and insure a steady showing of the consecutive frames.

Another object of the invention is to provide a viewer including a casing narrower at the top and wider at the bottom, so that light in a compartment in the upper portion is reflected downwardly through suitable lenses by a mirror mounted in a hood exteriorly of the casing, through a film supported on an apertured rest and in the lower, wider portion of the casing wherein other mirrors are arranged to project the light onto a screen supported in one wall of the lower wider portion.

A further object of the invention is to provide a viewer including a very simple and efficient means operated by movement of the film over a rest for rotating a shutter mounted beneath the latter and carrying a refraction block for stabilizing an image projected therethrough, and consists in one preferred form, of an internal gear having sprocket teeth on its outer periphery to engage perforations in the film, and a pinion in mesh with the internal gear having the shutter coaxially mounted for rotation therewith.

Another object of the invention is to provide a viewer including a casing in which an arm is pivotally mounted, a hood is arranged exteriorly of the casing over a rest and secured to the arm, means outside the casing for moving the arm so that the hood travels along a substantially vertical path, and means for arresting the travel of the hood when it reaches either its top or bottom position.

Yet another object of the invention is to provide a viewer including a resilient marker mounted for movement to engage and indent one margin of the frame then being projected onto a screen for easy subsequent identification of that particular frame.

Having thus briefly stated some of the objects and advantages of the invention I will now proceed to describe it in detail with the aid of the accompanying drawings, in which:

Figure 4 is a section on the line 4—4 of Figure 2.

Figure 5 is a partial front view on the line 5—5 of Figure 2.

Figure 7 shows a modified arrangement of the sprocket wheel and gearing for rotating the shutter, and Figure 8 is a section on the line 8—8 of Figure 7.

Figure 1:
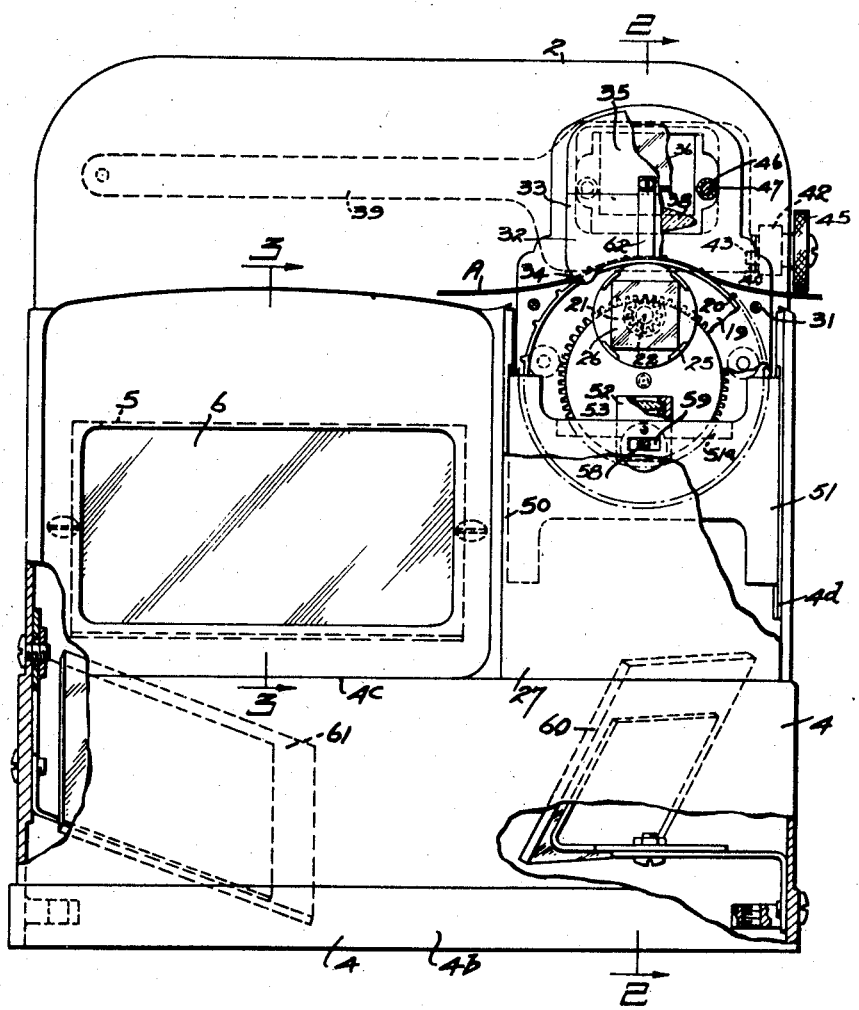
Figure 1 illustrates a front view of the invention with parts thereof broken away.
Figure 6:
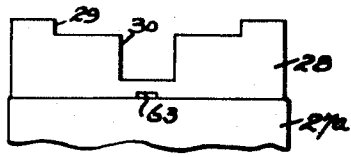
Figure 6 is a detail looking on the top of the rest.

Referring to the drawings, 1 designates a casing having an integral top 2 and sides 3 and 4; the bottom of the side 4 is positioned farther forward than the upper portion thereof. Formed in the side 4 toward one vertical margin is an inwardly flanged opening 5 which is forwardly and downwardly inclined and has a translucent screen 6, usually made of ground glass, suitably mounted therein. Toward the other vertical margin the side 4 consists of two vertical portions 4a and 4b, the former extends vertically downward for a short distance from the top 2, and the latter extends upwardly from the bottom of the casing and is forwardly positioned relative to the upper portion 4a.

Projecting from the inner face of the side 4 intermediately of its height and across its entire width is a horizontal, recessed bearing strip 7 to support the front margin of a partition 8 the lateral edges of which are carried by similar recessed bearing strips 7a provided on the inner faces of the opposite sides 3 of the casing. The partition 8 separates the interior of the casing into an upper compartment 9 and a lower compartment 10, the backs of which are closed by suitable panels 11 and 12 respectively. Mounted in and projecting through an opening formed in the partition 8 is a socket 13 in the upper end of which a lamp 14 is mounted in the upper compartment 9, and an electric cord 15 extends from the lower end of the socket through the lower compartment 10 for connection to any suitable source of electric current.

Figure 2:
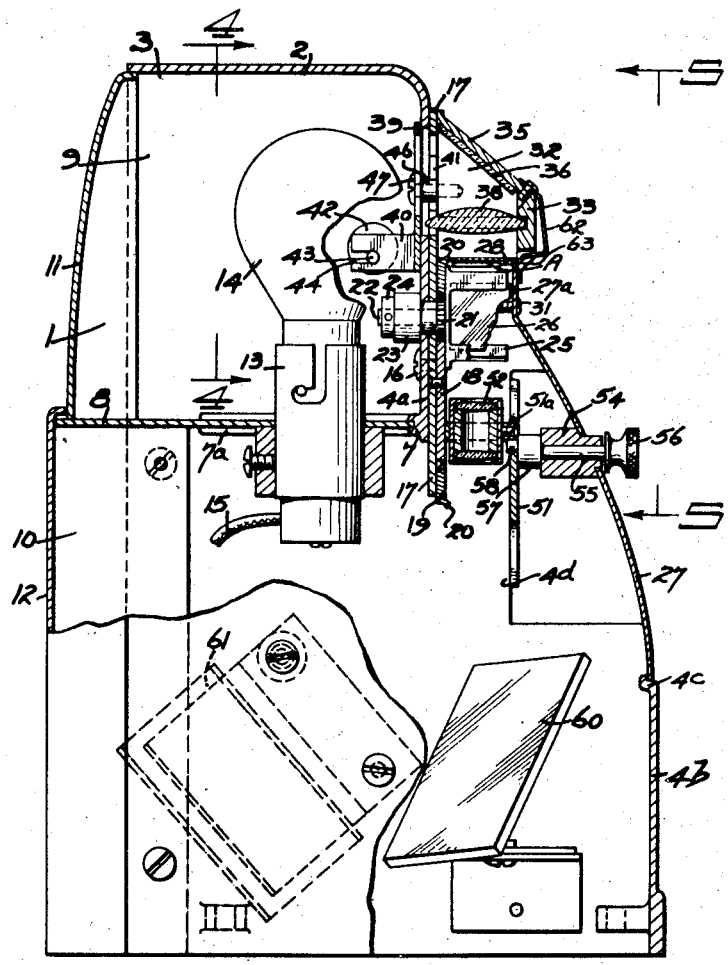
Figure 2 is a side view of the invention largely shown as a section on the line 2—2 of Figure 1.
Figure 3:
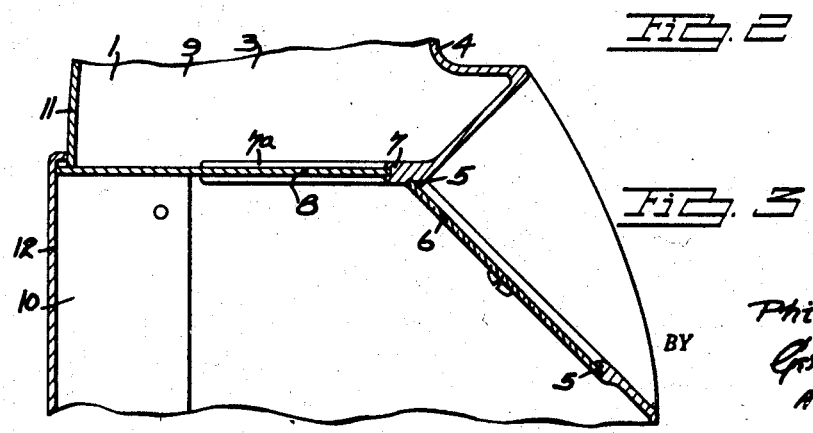
Figure 3 is a section on the line 3—3 of Figure 1.

Fastened on the outer face of the upper portion 4a of the side 4 of the casing as by screws 16 is a vertical plate 17. Secured upon the outer face of the latter is a bearing disc 18, and mounted for rotation on the said disc is an internal gear 19 having uniformly spaced sprocket teeth 20 projecting from its outer periphery. The bearing disc 18 is suitably recessed to receive a pinion 21 which meshes with the internal gear 19 and is mounted on a shaft 22 for rotation therewith. The shaft 22 is supported in a bearing 23 which fits into openings formed both through the side portion 4a and through the plate 17 and is of increased diameter rearwardly of the said side portion to form a shoulder to rest against the latter. Secured on the rear extremity of the shaft 22 contiguous to the back of the bearing 23 is a collar 24, and mounted on the front extremity of the said shaft for rotation therewith adjacent the pinion 21 is a shutter 25 which carries a multi-sided refraction block 26 having at least two of its opposite sides parallel. As shown in Figure 2 this block is usually supported at its corners by the said shutter.

27 denotes a cover plate the lower edge of which rests upon an upwardly directed step 4c formed on the lower side portion 4b. This cover plate is upwardly and rearwardly inclined and toward the top is provided with a vertical portion 27a rearwardly from which at the top thereof a rest 28 projects and terminates against the outer face of the plate 17. It will be noted that the rest 28 and the cover plate 27 form portions of a body by which the lower compartment 9 is in part enclosed. Formed centrally of the width of the rest 28 from the rear edge thereof is an elongated slot 29 through which some of the sprocket teeth 20 project; and extending forwardly from the slot 29 and centrally of the width of the rest 28 another opening 30 is formed through the latter. The rest is crowned or upwardly curved from opposite sides so that the curvature of the central portion lies substantially in the same transverse plane as the periphery of a portion of the gear 19. Thus the sprocket teeth 20 during a portion of the travel project a uniform distance above the rest 28. The latter and the cover 27 may be held in position by screws 31 extending through the vertical portion of the said plate and in threaded engagement with the plate 17.

Mounted exteriorly on the side portion 4a and over the rest 28 is a hood 32 movable in a substantially vertical path. The opposite vertical sides of the hood project forwardly from the plate 17 against which they bear, and extending between the front extremities of these vertical sides and integral therewith is a front wall 33 the inner face of which is substantially in vertical alignment with the outer face of the top vertical portion 27a of the cover plate. Depending from the front wall 33 of the hood are lugs 34, which, when the hood is lowered, lie contiguous to the outer face of the said vertical portion of the cover plate 27. The top of the hood 32 is closed by a forwardly and downwardly inclined wall 35 which has a mirror 36 secured upon its underside. The opposite sides and the front 33 of the hood intermediately of their height are grooved on their inner sides to form a horizontal seat upon which a collector lens 38 is cemented or otherwise suitably secured.

Pivoted on the front wall 4 of the casing toward the top thereof is an arm 39 having a rearwardly bent flange 40 on its outer extremity. Mounted for rotation in one of the sides 3 is a disc 42 having an eccentric pin 43 projecting therefrom which extends into a horizontal slot 44 formed in the flange 40 from its rear edge. Secured to the disc 42 and positioned exteriorly of the casing is a knob 45. Formed on the opposite vertical sides of the hood 32 and projecting rearwardly through openings formed through the plate 17 and the upper side portion 4a are bosses 46 which bear against the arm 39 and are secured thereto by means of screws 47 inserted from the rear of the said arm. Thus when the screws are tightened the hood is firmly held against the arm and the bosses prevent the rear faces of the vertical sides of the hood being drawn into binding engagement with the plate 17, since the hood is movable in front of the latter. The lower margins of the vertical sides of the hood 32, when the latter is lowered, are in close proximity to the rest 28 so that a piece of film A extending over the rest is retained in contact with the crowned face of the latter, and the projections 34 insure proper tracking of the film as it travels over the rest with the sprocket teeth in engagement with its perforations. An opening 48 is formed through the arm 39 so that in all positions of the latter light from the lamp 14 passes freely to the mirror 36 through openings formed through the side portion 4a and the plate 17.

Mounted for vertical movement in and between guides 50 on a vertical section 4d integral with the casing 1 is a slide 51 having an apertured rearward projection 51a at its upper extremity in which a suitable lens assembly 52 is held as by a set screw 53. Extending through and supported by the cover plate 27 is a bearing 54 through which a shaft 55 extends having a knob 56 on its outer extremity and a disc 57 on its inner extremity. Projecting from the latter is an eccentric pin 58 which engages a horizontal slot 59 formed through the slide 51 so that rotation of the knob moves the lens assembly 52 vertically. It will be noted that the axes of the lens assembly 52 and the collector lens 38 are aligned to pass through the film A and through the refraction block 26. Mounted in the lower compartment 10 are inclined mirrors 60 and 61 which are so positioned that an image from the film after passing through the lens assembly strikes the mirror 60 by which it is reflected onto the second mirror 61 and thus only the screen 6.

Mounted at one extremity on the hood 32 is a resilient marker 62 the lower extremity of which is rearwardly turned to engage a slot 63 formed in the front margin of the rest 27, so that when the marker is pushed inwardly it engages the front edge of the film A and makes an indentation in one of the frames thereof so that that frame may subsequently be readily located.

Figures 7 and 8 show a somewhat modified means for turning the rotary shutter when a sprocket wheel is turned by contact with the moving film. Mounted on and extending through a plate 65 is a tubular shaft 66 integral with a sprocket wheel 67 which engages the film perforations. Fixed on the tubular shaft 66 is a gear 68 which meshes with a pinion 69 supported on a shaft 70 mounted in the plate 65. Fixed on the pinion 69 for rotation therewith is a gear 71 which meshes with a second pinion 72 fixed on a shaft 73 which extends through and is rotatable in the tubular shaft 66. On the shaft 73 a rotary shutter 74 is secured which carries a refraction block 75.

While in the foregoing the preferred embodiments of the invention have been described and shown, it is understood that further alterations and modifications may be made thereto provided the said alterations and modifications fall within the scope of the appended claims.

What I claim is:

1. A viewer including a casing, a rest projecting outwardly on one side of the casing over which a film is adapted to travel, a hood mounted for movement in a substantially vertical path on the outer face of the casing over the rest, said hood being adapted to guide the film over the rest, a mirror mounted in the hood, the inner side of the hood being apertured to register with an opening through the adjacent side of the casing, means dividing the interior of the casing into separate compartments, one of said compartments being enclosed in part by rest, illuminating means in the other compartment from which light passes through the casing opening and hood aperture to the mirror whence it is reflected into the first named compartment through the film and through an opening formed beneath the latter in the rest, a translucent screen in one side of the first named compartment, mirrors in the first named compartment by which the light is reflected onto the screen after passing through the opening in the rest, and lenses interposed in the light path between the illuminating means and the screen.

2. A viewer including the combination set forth in claim 1, wherein a marker is mounted for movement on the hood, and the rest having a slot therein over which the film travels, one extremity of the marker being adapted to be moved into the slot and into engagement with one edge of the film to form an indentation therein.

3. The combination set forth in claim 1, including means depending from the hood outwardly of the rest and adjacent thereto, said means projecting below the rest when the hood is lowered to prevent outward lateral movement of the film.

4. A viewer including a casing, a crowned rest projecting outwardly on one side thereof over which a film is adapted to travel, a hood mounted for movement along a substantially vertical path on the outer face of the casing over the rest, the lower margins of the sides of the hood being adapted to engage the upper surface of the film and hold said film in contact with the rest, a mirror in the hood, the inner side of the hood being apertured to register with an opening through the adjacent side of the casing, means dividing the interior of the casing into separate compartments, one of said compartments being enclosed in part by said rest, illuminating means in the other compartment from which light passes through the casing opening and the hood aperture to the mirror whence it is reflected into the first named compartment through the film and through an opening formed beneath the latter in said rest, a translucent screen in one side of the first named compartment, means in the latter for reflecting light which passes through the opening in the rest onto the screen, a rotary shutter in the light path between the rest opening and the reflecting means, and means for rotating the shutter by movement of the film over the rest.

5. In a viewer, a casing including a rest over which a film is adapted to travel, means for retaining the film in contact with the rest, an internal gear rotatably supported on the casing, sprocket teeth projecting from the outer periphery of the internal gear through an opening in the rest to engage perforations in the film whereby the gear is turned by movement of the film, a pinion meshing with the internal gear rotatably supported by the casing, a rotary shutter carried by the pinion and coaxial therewith, said shutter being positioned beneath another opening in the rest over which the film passes, a refraction block in the shutter, illuminating means in the casing, means for directing the light therefrom downward through the film, the other rest opening and the refraction block, a translucent screen in one side of the casing, means for deflecting the light passing through the shutter onto the screen, and lenses interposed in the light path between the illuminating means and the screen.

6. In a viewer, a casing including a rest over which a film is adapted to travel, means for retaining the film in contact with the rest, a disc fixed on the frame, an internal gear mounted for rotation thereon, sprocket teeth on the internal gear to project through an opening in the rest and engage perforations in the film whereby movement of the latter turns said gear, a pinion rotatably supported on the frame in mesh with the internal gear, said pinion being positioned in a recess in said disc, a shutter mounted on the pinion for rotation therewith and positioned beneath another opening in said rest, a refraction block in the shutter, illuminating means in the casing, means for reflecting the light through the film, said other opening and the refraction block, a translucent screen in the casing, and means for deflecting the light passing through the refraction block onto the screen.

7. A viewer including a casing, a rest projecting outwardly on one side thereof over which a film is adapted to travel, a hood mounted on the outside of the casing for substantially vertical movement over the rest to retain the film in contact with the rest, an internal gear rotatably mounted on the casing, sprocket teeth projecting from the periphery of the gear to project through an opening in the rest and engage perforations in the film, a pinion meshing with the internal gear rotatably supported on the casing, a shutter having a refraction block therein supported by the pinion for rotation therewith, said shutter being positioned beneath another opening in the rest, the interior of the casing being divided into separate compartments, one of said compartments being enclosed in part by said rest, illuminating means in the other compartment, a mirror in the hood by which the light from the illuminating means passing through registering openings in the casing and hood is reflected through the film, the other rest opening and the refraction block, a translucent screen in one side of the first named compartment, means in the latter for deflecting light from the refraction block onto the screen, and lenses interposed in the light path between the mirror and the screen.

8. A viewer including a casing, a rest projecting outwardly from one side thereof, a hood over the rest on the outside of the casing, an arm pivoted in the casing, means extending through one side of the casing securing the hood to the arm whereby movement of the arm imparts substantially vertical movement to the hood, means for moving the arm extending through one side of the casing, means for illuminating the inside of the hood, means in the hood for directing the light down through the film and through an opening in the rest beneath the latter, said rest forming one wall of a compartment within the casing, a shutter mounted for rotation in the compartment beneath the rest opening, means for turning the shutter, a translucent screen in the compartment and mounted in one side of the casing, and means for deflecting light passing through the shutter onto the screen.

9. A viewer including a casing, a rest projecting outwardly from one side thereof, a hood over the rest on the outer face of the casing, an arm pivoted in the casing, means extending through one side of the casing securing the hood to the arm whereby movement of the latter imparts substantially vertical movement to the hood, rotary means for moving the arm, means for limiting the movement of the rotary means to halt its turning movement when the hood reaches either its top or bottom position, means dividing the interior of the casing into separate compartments, one of said compartments being enclosed in part by said rest, an illuminating means in the other compartment in which the arm is located, a mirror in the hood by which light from the illuminating means which passes through registering openings in the casing and hood is reflected through the opening in the rest, a translucent screen in one side of the first named compartment, and means in the latter for deflecting light passing through the rest opening onto the screen.

10. In a viewer, a casing divided interiorly into separate compartments a crowned rest projecting outwardly on one side of the casing over which a film is adapted to travel, a hood movable in a substantially vertical path on the outer face of the casing over the rest, an illuminating means in one compartment, one casing wall and the hood having registering openings through which light from the illuminating means passes into the hood, a mirror in the latter to reflect the light down through the film and through an opening in the rest beneath the latter, a lens carried by the hood between the mirror and the film through which the light passes, a rotary shutter having a refraction block therein in the other compartment and beneath the rest, a translucent screen in one wall of said other compartment, means for rotating the shutter by movement of the film over the rest, and adjustable lens assembly beneath the shutter through which the light passes, means for deflecting the light after it passes through the lens assembly onto the screen, and means for adjusting the distance of the lens assembly beneath the shutter.

11. In a viewer, a casing including a rest over which a film is adapted to travel, means for retaining the film in contact with the rest, an internal gear rotatably supported on the casing, sprocket teeth projecting from the outer periphery of the internal gear through an opening in the rest to engage perforations in the film whereby the gear is turned by movement of the film, a pinion meshing with the internal gear and rotatably supported by the casing, a rotary refraction block coaxial with the pinion and carried thereby, said block being positioned beneath another opening in the rest over which the film travels, illuminating means in the casing, light from said illuminating means passing through the film, the other rest opening and the refraction block, a translucent screen in the casing, and means for deflecting the light passing through the film and refraction block onto the screen.

12. In a viewer, a casing including a rest over which a film is adapted to travel, means for retaining the film in contact with the rest, an internal gear rotatably supported on the casing, sprocket teeth projecting from the outer periphery of the internal gear through an opening in the rest to engage perforations in the film whereby the gear is turned by movement of the film, a pinion meshing with the internal gear rotatably supported by the casing, a refraction block carried by the pinion and coaxial therewith, said block being positioned beneath another opening in the rest over which the film passes, illuminating means in the casing, means for directing the light therefrom downwardly through the film, the other rest opening and the refraction block, a translucent screen in the casing, means for deflecting the light passing through the refraction block onto the screen, and lenses interposed in the light path between the illuminating means and the screen.

13. In a viewer, a casing including a rest over which a film is adapted to travel, means for retaining the film in contact with the rest, a disc fixed on the casing, an internal gear mounted for rotation thereon, sprocket teeth on the internal gear projecting through an opening in the rest and engaging perforations in the film whereby movement of the latter turns the internal gear, a pinion rotatably supported on the frame meshing with the internal gear, said pinion being mounted in a recess on said disc, a refraction block carried by the pinion for rotation therewith and positioned beneath another opening in the casing, illuminating means in the casing, light from said illuminating means passing through the film, the other rest opening and the refraction block, a translucent screen in the casing, and means for deflecting the light passing through the refraction block onto the screen.

14. In a viewer, a casing, a rest projecting outwardly on one side thereof, over which a film is adapted to travel, a hood movable in a substantially vertical path over the rest mounted on the outer face of the casing for retaining the film in contact with the rest, an internal gear rotatably mounted on the casing, sprocket teeth projecting from the periphery of the internal gear through an opening in the rest to engage perforations in the film whereby the gear is turned by movement of the film, a pinion meshing with the internal gear rotatably supported by the casing, a refraction block coaxial with the pinion and carried thereby, said refraction block being positioned beneath another opening in the rest, means for illuminating the interior of the hood whereby the light passes through the film, the other opening and the refraction block, a translucent screen in the casing, and means for deflecting the light passing through the refraction block onto the screen.

15. A viewer including a casing, a rest projecting outwardly on one side thereof and forming a wall of the casing, a hood over the rest on the outside of the casing, an arm pivoted on the casing, means extending through one side of the casing securing the hood to the arm whereby movement of the latter imparts substantially vertical movement to the hood, means for moving the arm, means for illuminating the interior of the hood, said rest being apertured for the passage of the light through the film and through said aperture, a refraction block mounted for rotation beneath the aperture through which the light also passes, means for turning the refraction block by movement of the film over the rest, a translucent screen in the casing, and means for deflecting the light passing through the refraction block onto the screen.

PHILIP BAIA.

REFERENCES CITED

The following references are of record in the file of this patent:

UNITED STATES PATENTS

| Number | Name | Date |
|---|---|---|
| 2,285,644 | Bernzott | June 9, 1942 |
| 1,897,097 | Wright | Feb. 14, 1933 |
| 1,896,246 | Owens | Feb. 7, 1933 |
| 2,159,614 | Evans et al. | May 23, 1939 |
| 2,284,150 | Kemma | May 26, 1942 |
| 2,074,991 | Salcedo | Mar. 23, 1937 |
| 2,211,218 | Serrurier | Aug. 13, 1940 |